United States Patent Office 3,539,665
Patented Nov. 10, 1970

3,539,665
DYEABLE, LUSTERLESS POLYPROPYLENE PRODUCED BY BLENDING WITH POLYMERS OR COPOLYMERS OF TRIALLYL ISOCYANURATE OR TRIALLYL CYANURATE
Rajindar K. Kochhar, Overland Park, Kans., Harry D. Anspon, Bigelow Square, Pittsburgh, Pa., and Bert H. Clampitt, Overland Park, Kans., assignors to Gulf Oil Corporation, Pittsburgh, Pa., a corporation of Pennsylvania
No Drawing. Filed Apr. 17, 1968, Ser. No. 721,950
Int. Cl. C08f 29/12
U.S. Cl. 260—895
19 Claims

ABSTRACT OF THE DISCLOSURE

Dyeable, lusterless polyolefin, such as polypropylene, is produced by blending with small amounts of polymers or copolymers of triallyl isocyanurate or triallyl cyanurate. Finely dispersed additive is mixed with dry polypropylene then blended at temperatures above the melting point of polyolefin with conventional apparatus.

BACKGROUND OF THE INVENTION

This invention relates to a composition and method of making a dyeable lusterless polyolefin, such as polypropylene by blending with a minor portion of finely divided polymers or copolymers of triallyl isocyanurate or triallyl cyanurate.

One major drawback in synthetic fibers has been the lack of the number and variety of polar groups which are essential for dyeing. A second disadvantage, is the high degree of smoothness of the fiber surface which prevents adhesion of the dye during the first stage of the dyeing process. In the case of synthetic fibers of polypropylene, there is a complete absence of sites for polar dye molecules and the polymer is highly hydrophobic.

Water is the cheapest and almost universally employed medium used for dyeing various fibers. Therefore, any fiber that is to be dyed must be either naturally hydrophilic or should be hydrophilicity introduced to it. Various routes to circumvent these difficulties have been proposed, including the treatment of polyolefin, such as polypropylene, fibers with sulfuric or phosphoric acids, chlorinating agents, blending of the base polymer with monomeric or polymeric- dye-accepting compounds as well as with organometallic complexes of transition metals. These polar compounds should be present in sufficient amounts to provide a uniform heavy shade to the dyed fiber.

These efforts have not always been successful. The presence of a foreign material in any quantity in polyolefin is likely to be deleterious to the physical and other properties of the polymer. Also, any small heterogeneity introduced by dispersing the polar additive in the nonpolar polyolefin would show up rather conspicuously in the dyed fabric.

It is known to blend polyolefin, such as polypropylene with triallyl isocyanurate or triallyl cyanurale monomers. Also, bulk polymers and copolymers of triallyl isocyanurate and triallyl cyanurate are known in the prior art.

SUMMARY

It has been found that a dyeable, lusterless polyolefin, such as polypropylene, can be produced by blending a major portion of polyolefin, such as polypropylene with a minor portion of a polymer or a copolymer of finely divided triallyl isocyanurate or triallyl cyanurate. The finely divided additive polymer is preferably dry mixed with the polyolefin, such as polypropylene, and blended at temperatures above the melting point of the polyolefin, such as polypropylene, with conventional thermoplastic materials blending apparatus.

PREFERRED EMBODIMENTS

The following studies include the synthesis of a crosslinked polymer of poly(triallyl cyanurate) or poly(triallyl isocyanurate) and its uniform distribution in polypropylene. The finely dispersed infusible additive provides enough polar "anchoring sites" in the polypropylene for attachment to dyeing molecules. The added polar material is insoluble in most of the organic and inorganic solvents, so that the dye additive fiber combination provides adequate fastness properties for the dyed fabrics. In the following paragraphs triallyl cyanurate is abbreviated TAC and triallyl isocyanurate is abbreviated TAIC.

Preparation of poly(triallyl isocyanurate)

After investingating a number of methods for the suspension polymerization of TAIC the following recipe was found to give good yields of the polymer:

TAIC—265 g.
Water—1 l.
Triton N–101—30 g.
Potassium persulfate, $K_2S_2O_8$—1.5 g.

(1) TAIC was slowly dispersed with stirring in a solution of Triton N–101 contained in a 3 liter round-bottomed flask fitted with a mechanical stirrer and a reflux condenser.

(2) The contents of the flask were heated to 50° C. when potassium persulfate in about 15 ml. water was added, followed after about 25 minutes by a solution consisting of

| | G. |
|---|---|
| $NaHSO_3$ | 2 |
| $Na_2HPO_4$ | 2 | in 10 ml. water.

(3) The temperature of the flask was then raised to 70–75° C. and kept there for one hour.

(4) The flask was stored overnight without stirring at 50° C.

(5) The precipitated polymer was filtered, washed successively with water and methanol and dried in air. Yield was 52.5%.

(6) The polymer did not melt or degrade when heated to a temperature of 300° C.

(7) The polymer had an average particle size of less than 0.22 micron.

Blending of poly (TAIC)
with polypropylene

Polypropylene (99.5 parts) and poly(TAIC) (0.5 part) were dry mixed and blended in a Welding Engineers Point Eight Twin Screw Extruder. Screw speeds and zone temperatures are given in Table I. Mixing of 10 percent or more of poly(TAIC) in polypropylene was difficult as the screw developed a high torque from time to time. One percent or less of the poly(TAIC) in the polypropylene was easy to extrude and gave a clear film.

It is essential that the poly(TAIC) or poly(TAC) be finely divided. Best results are obtained when the average particle size of the emulsion polymerized poly(TAIC), or poly(TAC) or copolymers of them is less than 5 microns, and preferably less than 1 micron. Polymers which are not previously finely divided do not mix thoroughly enough to give satisfactory properties to the polypropylene.

TABLE I.—TWIN SCREW CONDITIONS

| Polypropylene, percent by weight Eastman, (Tenite). | Poly TAIC), (percent by weight | Temp., ° C., heating zones | | | | | | R.p.m. | Torque, gauge reading |
|---|---|---|---|---|---|---|---|---|---|
| | | 1 | 2 | 3 | 4 | 5 | 6 | | |
| 99.5 | 0.5 | 110 | 170 | 220 | 220 | 220 | 220 | 75 | 22 |
| 99 | 1.0 | 110 | 170 | 220 | 220 | 220 | 220 | | |
| 90 | 10 | 110 | 170 | 220 | 220 | 220 | 220 | 75 | 30 |
| 80 | 20 | 150 | 180 | 250 | 250 | 250 | 250 | 35 | 60 |

Preparation of monofilament

An Instron Rheometer was utilized to spin about 40 g. each of various polypropylene blends. Melt spinning was done through a 1 mm. hole die at 220° C. by downward extrusion into water. The congealed strand was collected on a glass reel run at a constant speed. Drawing of the molten filament at the die face was variable and uncontrolled. The cooled strand was hand stretched at room temperature to about four times its original length. Dyeing studies were conducted without further scouring of the strands.

Dyeing of polypropylene/poly(TAIC) monofilaments

One-fourth to one-half g. of monofilament was dipped in a 100 ml. solution of the dye in water contained in a 200 ml. round-bottomed flask fitted with a reflux condenser. The contents of the flask were brought to a boil during a period of 15 min. No other dye-bath adjuncts were employed in the process. Boiling under reflux was continued for a further period of 60 min. The "dyed" fiber was then taken out, washed freely with water, soaped for 15 min. at 50° C. and finally washed with water. A list of dyes used and the shades obtained with them are reported in Table II.

TABLE II.—DYEING OF POLYPROPYLENE/POLY(TAIC) BLENDS

| Description | Amacel Pink BFS (A)[1] | Foron Blue ER (S)[1] | Foron Pink FG (S)[1] | Artsil Yellow G (S)[1] | Remarks[2] |
|---|---|---|---|---|---|
| Polypropylene, pure | L[3] | M | L.M. | L.M. | High sheen. |
| 0.5% blend | L | M | L.M. | L | Smooth, sheen-free shade. |
| 1% blend | L | M.H. | L.M. | M | Do. |
| 10% blend | L.M. | H | | | Do. |
| 20% blend | L.M. | H | | | Do. |

[1] Dye-Manufacturer index: (A) American Aniline; (S) Sandoz.
[2] All shades are fast to soaping at 60° C. for 1 hr. with 0.1% soap solution.
[3] H=Heavy; M=Medium; L=Light.

Improved polypropylene results when as little as 0.01 or up to 30% by weight of poly(TAIC) or poly(TAC) or a copolymer of them is added. However, better results are obtained when 0.5 to 10% by weight is used, and the preferred amount is 1.0 to 5% by weight. In addition to spun fiber the polypropylene could be dyed in any form such as a film, ribbon or molding or from fiber prepared by other methods such as split film, or by the process described in our copending U.S. application Ser. No. 627,274, filed Nov. 15, 1966. Blending of the additive to the polypropylene can take place at any temperature above the melting point and below the degradation temperature of the polypropylene. Temperatures between 200° and 350° C. are the most effective.

In addition to polypropylene, other polyolefins, such as polyethylene, and olefin copolymers, such as ethylene-propylene copolymers, can be improved in the same manner, by the same method.

In addition to poly(TAC) and poly(TAIC), copolymers of TAC and TAIC can be used to improve polyolefins in the same manner, by the same method.

What is claimed is:
1. A dyeable, lusterless polypropylene composition consisting of a major portion of polypropylene blended with a minor portion, 0.01 to 30% by weight of a finely divided polymer selected from the group consisting of polymerized triallyl isocyanurate, polymerized triallyl cyanurate or copolymers of triallyl isocyanurate with triallyl cyanurate.

2. The composition of claim 1 wherein said finely divided polymer has a particle size of less than 5 microns.

3. The composition of claim 1 wherein said finely divided polymer has a particle size of less than 1 micron.

4. The composition of claim 1 wherein said finely divided polymer has a particle size of less than 0.22 micron.

5. The composition of claim 1 wherein said composition contains 0.5 to 10% of said minor portion polymer, by weight.

6. The composition of claim 1 wherein said composition contains 1.0 to 5% of said minor portion polymer, by weight.

7. The method of obtaining a dyeable, lusterless polyolefin composition comprising:
 (a) mixing a polyolefin selected from polypropylene, polyethylene and ethylene-propylene copolymers with a finely divided polymer selected from the group consisting of polymerized triallyl isocyanurate, polymerized triallyl cyanurate and a copolymer of triallyl isocyanurate with triallyl cyanurate, then
 (b) blending said mixture in a conventional thermoplastic materials blending appartus at temperatures above the melting point and below the degradation temperature of the polyolefin being mixed, then
 (c) removing said mixture, from said blending apparatus and cooling said mixture to a temperature below the melting point of the polyolefin, then
 (d) shaping said mixture into a dyeable form, then
 (e) dyeing said mixture.

8. The method of claim 7 wherein said polyolefin is polypropylene.

9. The method of claim 7 wherein said finely divided portion has a particle size of less than 5 microns.

10. The method of claim 7 wherein said finely divided portion has a particle size of less than 1 micron.

11. The method of claim 7 wherein said finely divided portion has a particle size of less than 0.22 microns.

12. The method of 8 wherein the amount of finely divided polymer of step (a) is between 0.01 to 30% by weight.

13. The method of claim 8 wherein the amount of finely divided polymer of step (a) is between 0.5 to 10% by weight.

14. The method of claim 8 wherein the amount of finely divided polymer of step (a) is between 1.0 to 5% by weight.

15. The method of claim 8 wherein the blending of step (b) takes place at temperatures between 200 to 350° C.

16. The method of claim 7 wherein the said dyeable form of step (d) is a fiber.

17. The method of claim 7 wherein the said dyeable form of step (d) is a film.

18. The method of claim 7 wherein the said dyeable form of step (d) is a tape or ribbon.

19. The method of claim 7 wherein the said dyeable form of step (d) is a molded article.

(References on following page)

References Cited

UNITED STATES PATENTS

| | | | |
|---|---|---|---|
| 3,003,845 | 10/1961 | Ehlers | 260—895 |
| 3,037,979 | 6/1962 | Fukui et al. | 260—895 |
| 3,244,709 | 4/1966 | D'alelio | 260—895 |
| 3,242,140 | 3/1966 | Hoover | 260—77.5 |

MURRAY TILLMAN, Primary Examiner

M. J. TULLY, Assistant Examiner

U.S. Cl. X.R.

260—77.5, 85.5, 897